No. 724,932. PATENTED APR. 7, 1903.
F. I. DU PONT.
ART OF PURIFYING NITROCELLULOSE.
APPLICATION FILED MAY 23, 1902.
NO MODEL.
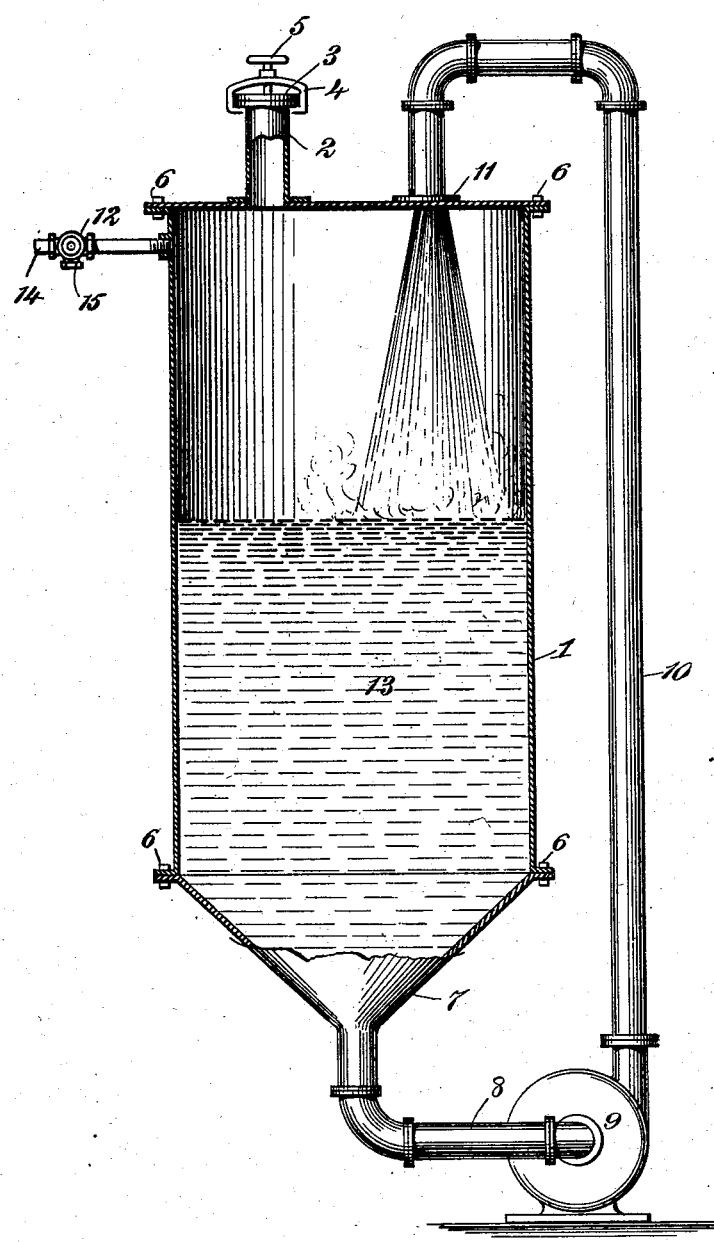
WITNESSES:
William P. Goebel.
Walton Harrison.
INVENTOR
Francis I. Du Pont
BY
ATTORNEYS.

UNITED STATES PATENT OFFICE.

FRANCIS IRENÉE DU PONT, OF WILMINGTON, DELAWARE.

ART OF PURIFYING NITROCELLULOSE.

SPECIFICATION forming part of Letters Patent No. 724,932, dated April 7, 1903.

Application filed May 23, 1902. Serial No. 108,654. (No specimens.)

*To all whom it may concern:*

Be it known that I, FRANCIS IRENÉE DU PONT, a citizen of the United States, residing at Wilmington, in the county of Newcastle and State of Delaware, have invented a new and useful Improvement in the Art of Purifying Nitrocellulose, of which the following is a full, clear, and exact description.

My invention relates to an improvement in the art of purifying nitrocellulose and analogous substances, the object more particularly being to dislodge impurities which affect the stability, as shown by the usual tests, and also to remove any gaseous impurities which may be occluded within the material.

Reference is to be had to the accompanying drawing, forming a part of this specification, in which the figure represents one form of apparatus suitable for carrying out my process. It should be understood, however, that I do not limit myself to this or any other particular form of apparatus.

A tank 1 is provided with a neck 2 and with a closure-lid 3, together with a clamp 4 for holding the same in position. A hand-wheel 5 is for the purpose of operating the clamp, and thereby rendering the closure member air-tight or removing the same from the position shown, as desired. The tank is provided with bolts 6 6 6 6, whereby its seams are rendered air-tight and water-tight. The tank terminates below in a funnel 7, from which a pipe 8 leads to a centrifugal pump 9. From this pipe another pipe 10 leads upward to the top of the tank, terminating in a mouth 11, which empties into the tank. A three-way valve 12, provided with an inlet-passage 14 and with an exit-passage 15, is used for the purpose of compressing air within the tank and for releasing the compressed air into the open atmosphere.

A liquid 13, preferably water, partially fills the tank, and the substances to be cleaned are submerged beneath the surface of this liquid.

The apparatus is used as follows: The hand-wheel 5 being loosened, the clamp 4 and closure-plate 3 are removed and a suitable quantity of liquid, preferably water, is introduced into the tank, as shown. The nitrocellulose or other substances to be purified are also inserted through the neck 2 into the tank and dropped loosely into the water. The centrifugal pump 9 is now set to work and continually carries the mixture of water and materials to be purified from the tank 1 downward to the funnel 7 and pipe 8 and upward through the pipe 10 back into the tank, as shown in the figure. The closure-plate 3 being secured in the position shown and rendered air-tight, compressed air or other analogous gas is forced through the pipe 14 into the upper portion of the tank at a considerable pressure—say one hundred pounds per square inch. The pressure varies with the nature of the materials to be purified and is to some extent a matter of individual judgment. I find that a pressure of one hundred pounds gives good results. The admixture of nitrocellulose and water or other liquid 13 being showered continuously through the gas under pressure absorbs large quantities thereof, the percentage of gas absorbed being to some extent dependent upon the nature of the liquid, the temperature, the purity of the liquid, the kind of gas used, &c.

The pump 9 is operated continuously until all parts of the liquid are saturated with the gas, and then by means of the valve 12 the compressed air in the tank is suddenly liberated through the exit 15. This abrupt variation in atmospheric pressure causes the air occluded or absorbed within the water and also within the nitrocellulose to expand suddenly, whereby a violent ebullition takes place. The result is that impurities contained within the substance of the nitrocellulose are dislodged and of course serve to render the water more or less impure.

My theory of the action of the air is that when the air is absorbed by the water and the water subjected to pressure the minute quantities of gas occluded in the fibers of the nitrocellulose are gradually compressed. When, therefore, the atmospheric pressure is suddenly relieved, these particles of gas expand violently. If there be little or no gas occluded in the nitrocellulose, the air in the water serves the same purpose and is forced into the pores of the nitrocellulose, and they are caused to expand violently, yielding up the impurities with the escaping air. Also the air acts to some extent like nascent oxygen, oxidizing such impurities as nitrous acid and its compounds.

I find that the purification of the nitrocellulose and analogous substances is thorough and extends throughout the interior of the substance. It is not a mere superficial cleansing. It is a purifying, due to physical and possibly chemical causes, but is far more thorough than purifying effected in other ways.

After the process is over the liquid 13 may be lifted through the neck 2 and clear water admitted instead. The apparatus may then be operated substantially as before, with the result that the nitrocellulose is thoroughly rinsed. Finally, the water and nitrocellulose may be lifted through the neck 2 or discharged by any well-known mechanical expedient.

Having thus described my invention, I claim as new and desire to secure by Letters Patent—

1. An improvement in the art of purifying nitrocellulose and like substances; which consists in bringing the same into contact with a liquid, causing said liquid to absorb a gas, and causing said liquid to suddenly release said gas, thus dislodging impurities from the substances to be cleaned.

2. An improvement in the art of purifying nitrocellulose and like substances; which consists in bringing the same into contact with water, forcing air under pressure into contact with said water, thereby causing said water to absorb a part of said air, and then suddenly releasing said pressure upon said water and said air contained therein, thereby allowing said air to expand violently and dislodge impurities from the substances to be purified, and acting like nascent oxygen to oxidize nitrous acid and its compounds.

3. An improvement in the art of purifying nitrocellulose and like substances; which consists in submerging the same in water, continuously agitating the said water containing said substances, and subjecting said water containing said substances to an abrupt variation in atmospheric pressure for the purpose of dislodging impurities from said substances.

4. An improvement in the art of purifying nitrocellulose and like substances; which consists in submerging the same in water, subjecting said water directly to contact with air under pressure, agitating said water thus treated and said substances together, and suddenly relaxing the air-pressure from said water, thereby allowing said air to expand violently, thus dislodging impurities from said substances into said water, and acting like nascent oxygen to oxidize nitrous acid and its compounds to nitric acid and its compounds, which are easily removed with the water.

5. An improvement in the art of purifying nitrocellulose and like substances; which consists in showering a mixture of nitrocellulose and water through an atmosphere of compressed air, then gathering said nitrocellulose and said water together, said nitrocellulose being contained within said water, and finally releasing the air-pressure to allow the air, as it escapes, to dislodge various impurities which might otherwise affect the stability of the nitrocellulose.

In testimony whereof I have signed my name to this specification in the presence of two subscribing witnesses.

FRANCIS IRENÉE DU PONT.

Witnesses:
   CLIFFORD V. MANNERING,
   REUBEN SATTERTHWAITE, Jr.